March 16, 1937.  A. P. BRUSH  2,073,864
AIRCRAFT
Filed Nov. 10, 1934  2 Sheets-Sheet 1
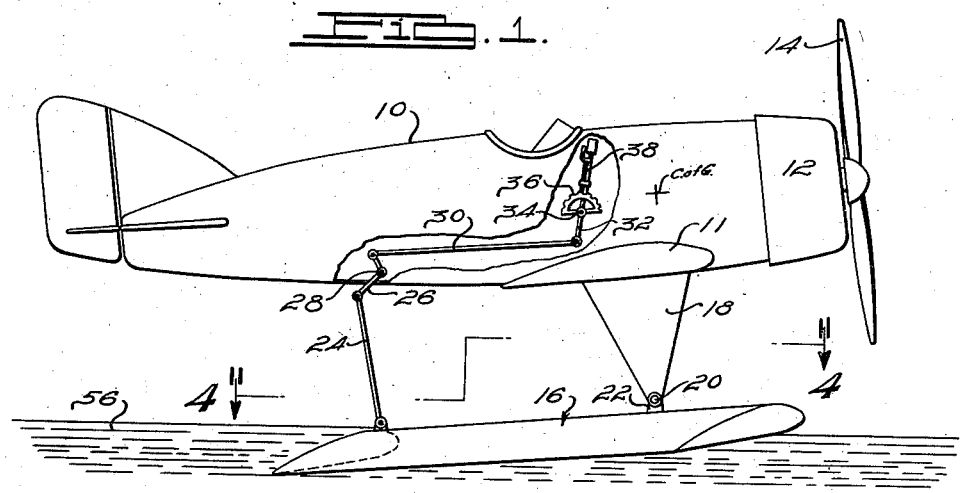
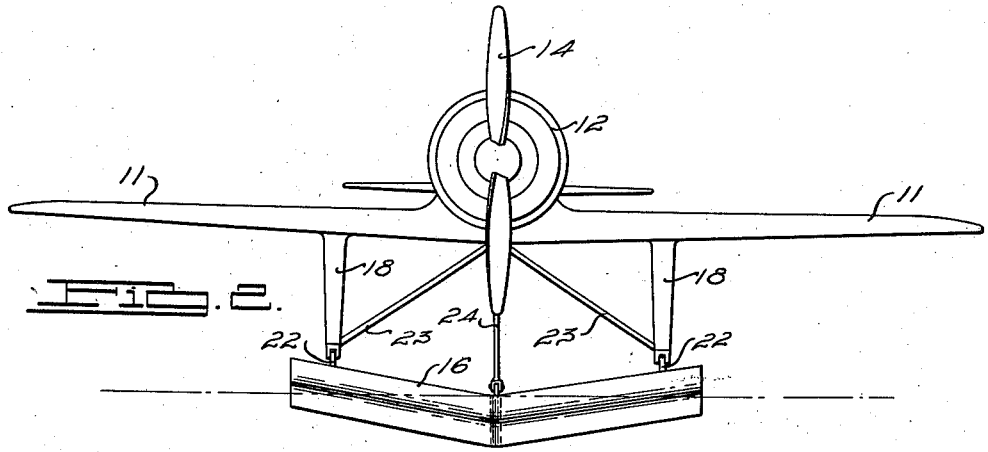
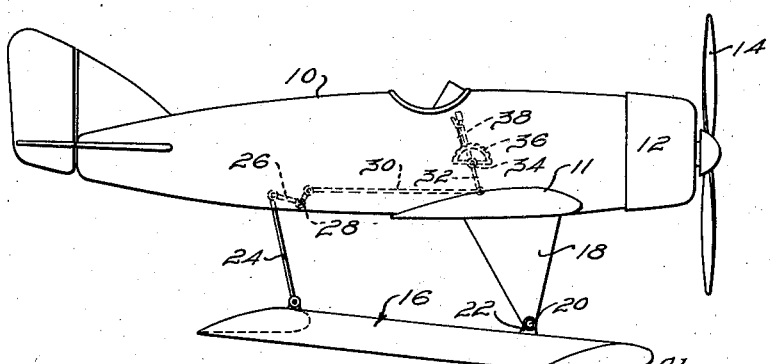
INVENTOR.
Alanson P. Brush.
BY
Harness, Dickey, Pierce & Hann
ATTORNEYS.

March 16, 1937. A. P. BRUSH 2,073,864
AIRCRAFT
Filed Nov. 10, 1934   2 Sheets-Sheet 2
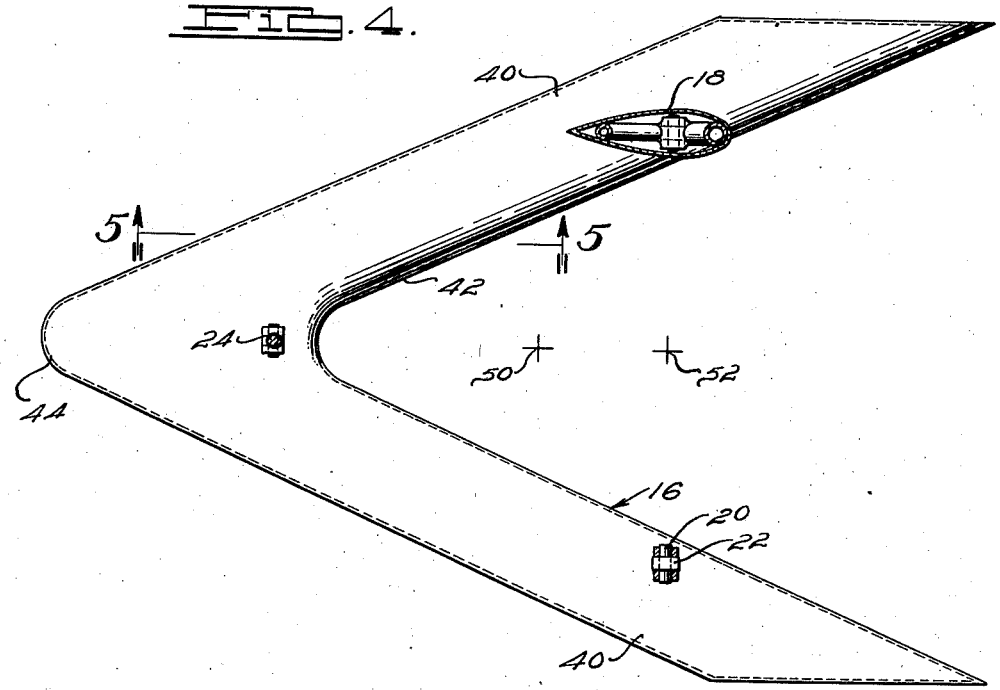
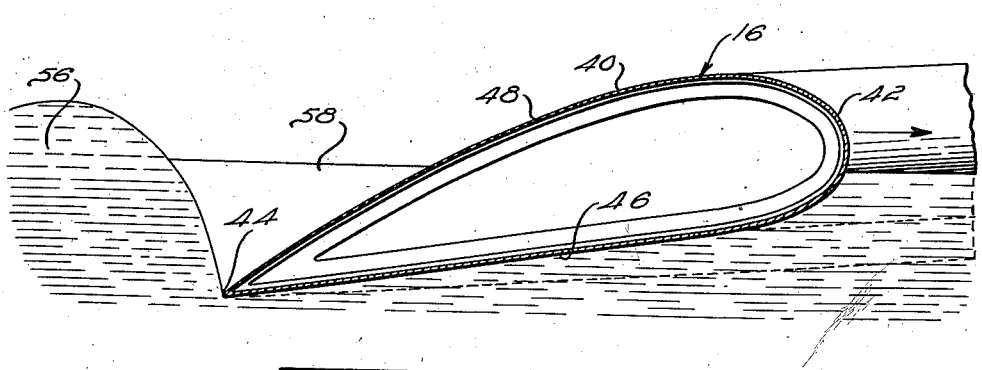
INVENTOR.
Alanson P. Brush,
BY
Harness, Dickey, Pierce & Hann.
ATTORNEYS.

Patented Mar. 16, 1937

2,073,864

UNITED STATES PATENT OFFICE 2,073,864

AIRCRAFT

Alanson P. Brush, Detroit, Mich.

Application November 10, 1934, Serial No. 752,421

6 Claims. (Cl. 244—105)

This invention relates to aircraft and particularly to such aircraft as are equipped with pontoons permitting them to land upon and take off from a body of water, the principal object being the provision of a pontoon structure for aircraft that is simple in construction and efficient in operation.

Objects of the invention include the provision of a pontoon structure for aircraft that will exert a minimum amount of drag to passage over or release from a water surface; the provision of an aircraft pontoon that will have an equal hydrodynamic lift for each increment of its length and width when passing over the water and thereby will aid in preventing pitching of the cooperating airplane; the provision of a pontoon for airplanes so constructed and arranged as to have a planing surface of material width and length so as to provide a relatively great amount of stability therein but in which the dimensions of the planing surface taken in any vertical plane parallel with the longitudinal axis of the airplane will be relatively small so as to provide a minimum of resulting drag when in contact with the water; the provision of an airplane pontoon so constructed and arranged that all portions of the planing surfaces thereof when planing upon a water surface will not be required to pass over water which has been previously disturbed by another or other portions of a planing surface; the provision of an airplane pontoon of V shape in plan and of airfoil section in a vertical plane taken parallel to the axis of the airplane and so constructed and arranged that the lower surface thereof will serve as a planing surface when in contact with the water; the provision of a pontoon structure for airplanes of such a construction as to offer a minimum amount of hydrodynamic and aerodynamic drag and a maximum amount of hydrodynamic and aerodynamic lift; and the provision of a pontoon structure for airplanes so constructed and arranged that its buoyant effect when moving on the water will be materially greater than its buoyant effect when at rest on the water.

Other objects include the provision of an airplane having a novel form of pontoon structure associated therewith; the provision of an airplane having a pontoon structure so constructed and arranged as to aerodynamically react upon the air through which it is passing so as to cause such reaction with the air to substantially support a material amount of the weight thereof; the provision of an airplane having a pontoon structure associated therewith so constructed and arranged so as to cause a minimum amount of vertical movement of the airplane and a minimum amount of pounding of the pontoon on the water when passing over relatively rough water; and the provision of an airplane having a pontoon structure of airfoil section associated therewith and so adjustable in inclination with respect to the path of travel as to permit the pontoon to be adjusted for optimum water contact conditions and optimum flight conditions.

The above being among the objects of the present invention, the same consists in certain novel features of construction and combinations of parts to be hereinafter described with reference to the accompaying drawings, and then claimed, having the above and other objects in view.

In the accompanying drawings which illustrate a suitable embodiment of the present invention and in which like numerals refer to like parts throughout the several different views, Fig. 1 is a partially broken side elevational view of an airplane equipped with my improved pontoon structure, and shown at rest upon a water surface.

Fig. 2 is a front elevational view of the construction shown in Fig. 1.

Fig. 3 is a slightly reduced side elevational view of the airplane shown in Fig. 1 during flight and with the pontoon adjusted for flight conditions.

Fig. 4 is an enlarged sectional view taken on the line 4—4 of Fig. 1 showing the float in plan view.

Fig. 5 is an enlarged vertical sectional view taken on the line 5—5 of Fig. 4.

It is common practice to fix to the underside of airplanes buoyant bodies commonly known as pontoons to enable the airplane to land upon or take off from a body of water. In some cases a single pontoon is employed and made of sufficient width to provide the necessary lateral stability, while in other cases two laterally spaced pontoons are employed each of relatively narrow width and the spacing of which provides the necessary lateral stability for the airplane on water. In both cases the pontoons are made of sufficient length to obtain the necessary longitudinal stability. In either case it is usually the practice to form the underside of the pontoon to conform to the general practice of shaping the bottoms of hydroplanes so that when the airplane is passing over a body of water and supported or partially supported on the water the reaction between the water and the pontoons will tend to raise the pontoons out of the water and to permit them to slide over the surface thereof. Due to the shape of such planing surfaces, they create a considerable amount of drag caused by adhesion of the water and such surfaces which must be overcome when the airplane is lifting to bring the pontoons out of contact with the water, and in a great many instances where the surface of the water is substantially smooth, unless it is possible to momentarily relieve this drag by artificially roughening the surface of the water, it is impossible, particularly where the airplane is relatively heavily loaded, to get it off of the water. After airplanes equipped with such pontoons are once in the air it will be apparent that the pontoons themselves, which must be relatively heavily constructed in order to withstand the usages to which they are put when in contact with the water, and because they have little or no aerodynamic value, form a substantially dead weight which must be supported by the airplane in addition to its load and such pontoons, accordingly, considerably reduce both the pay load and the factor of safety of the airplane. Also as such pontoons are conventionally constructed they provide a considerably greater amount of buoyancy than that actually required to support the airplane on the water when at rest and are conventionally of such shape that if the airplane is running on the water and the water is rough the variations in lifting effect on the pontoons caused by the waves causes the pontoons to be heavily pounded by the water and subjects the airplane to relatively violent vertical forces fostering early destruction of the same and tending to cause pitching of the airplane. All of these disadvantages of conventional constructions are, to a great measure, overcome by the present invention.

Referring now to the accompanying drawings, in Fig. 1 is illustrated an airplane illustrated as of the low wing monoplane type including a fuselage 10, wings 11, cowl 12 enclosing an engine, not shown, which drives a tractor propeller 14, and other usual and/or conventional parts. Mounted below the airplane is a pontoon structure indicated generally in Figs. 1 to 3, inclusive, at 16. A pair of laterally spaced supports 18, preferably of airfoil section, are fixed to the wings 11 and project downwardly therefrom, their lower ends being connected by pins 20 and brackets 22 with the forward portion of the pontoon 16. Braces 23 are preferably provided between the lower ends of the supports 18 and the fuselage 10 to impart added rigidity to the supports. While any suitable means may be provided for securing the rear end of the pontoon 16 to the fuselage 10, that shown by way of illustration comprises a link 24 pivotally connected at its lower end to the rear portion of the pontoon 16 and pivotally connected at its upper end to one arm of a bell crank 26 pivotally mounted on the fuselage at 28. The other arm of the bell crank 26 is connected by a rod 30 to a lever 32 pivoted to the fuselage at 34. Suitable locking means including a sector 36 and manually controllable latch member 38 is provided for releasably locking the lever 32 in pivotally adjusted position. As will be apparent, movement of the lever 32 acting through the links 24 and 30 and bell crank 26 will cause the rear end of the pontoon 16 to be raised or lowered according to the direction of movement of the lever 32 and thus vary the inclination of the pontoon with respect to the central axis of the airplane.

Referring now to Figs. 4 and 5, it will be noted that the pontoon 16 is of V-shape formed in plan view, and although the V may open either towards the front or towards the rear in the broader aspects of the invention, it is shown, by preference and by way of illustration, as opening toward the front of the airplane. The rearwardly converging sides 40 of the pontoon are of a material width as indicated and the cross-sectional configuration of the pontoon is such that a section of the same taken in substantially any vertical plane parallel to the longitudinal axis of the airplane at any point in the length or width of the pontoon is of airfoil section as indicated in Fig. 5. In other words, such view will indicate that the pontoon is provided with a relatively blunt leading edge 42, a relatively sharp trailing edge 44, a relatively flat lower face 46 and a generally curved or rounded upper face 48 which generally simulates the section of a thick sectioned airplane wing.

For the purposes of the present invention it is preferable that when the general plane of the pontoon is parallel to the longitudinal axis of the airplane the angle of the lower face 46 measured in a vertical plane parallel to the section taken in Fig. 5 will be inclined upwardly and forwardly so that it will be sufficient for proper planing reaction upon the water when the airplane is running over the surface of the water in landing or in preparation to taking off. In other words, the angle of attack of the pontoon is preferably greater than the angle of attack of the wings 11 under such circumstances. In this respect it will be understood, of course, that the airplane, in order to obtain maximum speed upon the water and when wholly or partially supported on the water by the pontoon, will be positioned with its longitudinal axis preferably parallel with the surface of the water or slightly inclined upwardly and forwardly therefrom. When the airplane is at rest, however, its nose is preferably slightly elevated with respect to its tail and, accordingly, it is preferable to so position the pontoon 16 with respect to the airplane that the center of buoyancy of the pontoon which is illustrated at 50 in Fig. 4 is preferably disposed rearwardly of a vertical line indicated at 52 in Fig. 4 passing through the center of mass of the airplane. Thus when the airplane is at rest upon the water it will assume the relative position with respect to the surface of the water 56 indicated in Fig. 1. It will be understood, of course, that as soon as the airplane is put under way while supported by the water the reaction of the water against the lower surface 46 of the pontoon will provide the principal source of support for the airplane on the water, and because the pontoon is designed for simultaneous water contact at all times over its full length and width the airplane will substantially immediately assume a position in which its longitudinal axis is substantially parallel to the general plane of the pontoon 16 under such conditions. Another feature of the present invention in this respect is illustrated in Fig. 5 wherein is illustrated the condition which occurs when the airplane is first put in motion while supported on the water and in which it will be noted that, due to the forward movement of the pontoon 16 in the water, the relative flow of water under the trailing edge 44 will cause a trough of air 58 to be formed above the rear edge of the pontoon throughout its full length and thus, in effect, create an increased effective buoyancy of the pontoon. It will also be understood that when the airplane just starts up in the water, the water will contact the full length of the surface 46 as measured in a vertical plane parallel to the longitudinal axis of the airplane, and as the speed of the airplane increases this length of water contact with the surface 46 will decrease in proportion to the increase in speed. Thus by the time a speed sufficient to take off from the water is reached only a very small amount of water contact, measured in the manner referred to above, will remain and very little, if any, effort will be required to break it loose from the water when the rudder is elevated to take off.

As will particularly be noted from an inspection of Figs. 1 and 2, the buoyant effect of the pontoon 16 is preferably not excessively greater than that required to sustain the weight of the airplane when loaded and at rest upon the water so that a major portion of the pontoon will preferably be submerged under such conditions. This, coupled with the fact that the pontoon is of airfoil section in the direction of movement and presents a relatively small bulk to the water, will lessen the pitching of the airplane when the water is rough and while at rest. Additionally, when the water is rough and the airplane is running on the water this same feature will permit the pontoon to break completely through waves with but relatively small variations in the buoyant lifting effect of the pontoons on the airplane and consequently will reduce pitching of the airplane under such conditions and will relieve both the pontoons and the airplane of considerable stress which would otherwise occur due to such pitching caused from variations in the buoyant lifting effect of the pontoons. Additionally, because of the V-like formation of the pontoons, only a relatively small area thereof will come at once into contact with the waves as the pontoon is passing over the water, but rather each increment of length will successively come in contact with the waves, and will thus eliminate to a great extent the pounding which occurs in conventional constructions due to a relatively broad surface instantaneously receiving the full force of a wave which is met. These factors will aid in providing a pontoon structure eliminating many of the more serious defects of conventional constructions.

Because of the airfoil section of the pontoon, it will be apparent that not only does it provide a suitable planing surface when the airplane is running over the water but additionally after the airplane has taken off from the water the very nature of the shape of the pontoon will cause it to serve as an additional airfoil or lifting surface of the airplane, and the variation of this lifting effect may be controlled by operating the lever 38 so as to raise or lower the rear end of the pontoon 16 to control the angularity of the chord of the airfoil section of the pontoon with respect to the direction of travel of the airplane, in other words, its angle of attack. Ordinarily, because of the preferred angularity of the lower surface of the airfoil section of the pontoon for use when planing over the water, it will be desirable to raise the rear end of the pontoon when in the air to a position such as indicated in Fig. 3, so as to bring the chord of the airfoil section thereof into substantial parallelism with the chord of the main wings 11, or to equalize the angles of attack of their surfaces. In such position it will be apparent that with a pontoon construction of suitable lightness the lifting effect on the pontoon by the air may be sufficient to support a substantial if not the entire weight of the pontoon and thus relieve the airplane itself of this additional load during flight. In fact with proper design and materials the pontoon may be capable of not only supporting its weight through its aerodynamic action on the air, but also serve as an added lifting surface for the airplane as a whole, aiding in supporting the load thereof. In this respect it will be noted that, because of the characteristics of the present pontoon as previously pointed out in connection with its action on and in the water, it does not require as heavy a construction as is necessitated in conventional constructions. The structural features of the pontoon are, however, immaterial as far as the present invention is concerned as long as the proper shape and contour thereof is substantially maintained and any suitable type or form of construction and material may be employed in the same.

Formal changes may be made in the specific embodiment of the invention described without departing from the spirit or substance of the broad invention, the scope of which is commensurate with the appended claims.

What I claim is:

1. In combination, an airplane, a relatively flat pontoon of V-shaped formation in plan view with the opening of the V disposed toward the front of the airplane mounted below the same, the bottom surface of said pontoon on each side of said V being approximately planular and formed to provide a positive hydrodynamic angle with respect to the general plane of the pontoon and means for varying the general plane of the pontoon with respect to the longitudinal axis of the airplane during flight.

2. In combination, an airplane and a pontoon disposed below the same, said pontoon being of V-shaped formation in plan view with the opening of the V disposed toward the front of the airplane and of a shape presenting an airfoil section when viewed in substantially any vertical plane taken throughout its width parallel to the longitudinal axis of the airplane, the bottom line of any such section being substantially straight to form a planing surface and being disposed at a material planing angle to the plane of the trailing edge of said pontoon.

3. A pontoon for airplanes and the like comprising a relatively flat buoyant body of V-shaped formation in plan view and of airfoil shape in a vertical section taken parallel with the longitudinal axis of the pontoon, the opening of the V being disposed toward the front of the pontoon the angle of attack of said airfoil section being positive with respect to the general plane of said pontoon and the bottom line of any such section being substantially flat whereby to provide a water planing surface at an angle to the general plane of the pontoon.

4. In combination, an airplane, a pontoon secured to the under-side thereof, said pontoon being of V-shaped formation in plan view with the opening of the V disposed toward the front of the airplane and of airfoil shape in any section taken between its lateral side edges in a vertical plane parallel with the central axis of said airplane, the trailing edges of said pontoon lying substantially in a single plane, the bottom line of any of said sections being approximately straight and being arranged at a positive and material angle with respect to the plane of said trailing edges whereby to provide a hydrodynamic planing surface having a positive planing angle, and means for varying the position of said pontoon relative to said central axis whereby the angle of incidence of said sections with respect to said central axis may be varied in flight.

5. In combination, an airplane, a pontoon structure mounted therebelow, said structure having pontoon portions extending at an angle to a vertical plane through the longitudinal axis of the airplane, said portions being spaced apart a greater distance at the front than at the rear and being of airfoil section in planes parallel to said vertical plane, the rear portions of the bottom lines of said sections being substantially straight and disposed at a material positive planing angle to the general horizontal plane of said pontoon structure, and means for varying the angle of attack of the pontoon during flight.

6. In combination, an airplane and a pontoon disposed below the same, said pontoon being of V-shaped formation in plan view with the opening of the V disposed toward the front of the airplane, said pontoon being of a shape presenting an airfoil section when viewed in substantially any vertical plane taken throughout its width and parallel to the longitudinal axis of the airplane, the rear portion of the bottom line of any such section being substantially flat to form a planing surface and being disposed at a material positive planing angle to the plane of the trailing edge of said pontoon.

ALANSON P. BRUSH.